Figures 1, 2, 3:
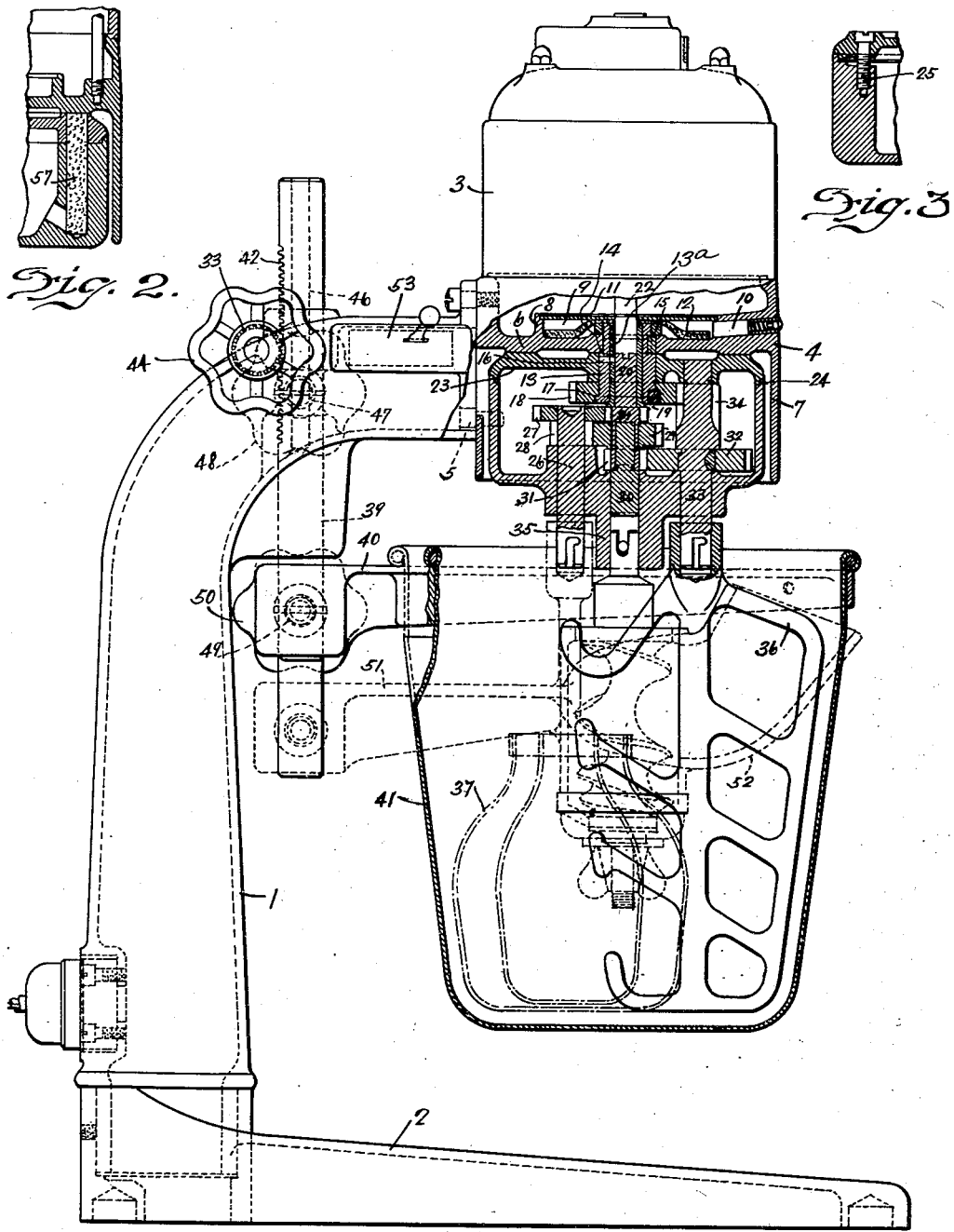

Feb. 3, 1931. E. P. LARSH 1,790,928
MIXING MACHINE
Filed Aug. 24, 1927

Inventor
Everett P. Larsh
By T. R. Walker
Attorney

Patented Feb. 3, 1931

1,790,928

UNITED STATES PATENT OFFICE

EVERETT P. LARSH, OF DAYTON, OHIO, ASSIGNOR TO THE MASTER ELECTRIC COMPANY, OF DAYTON, OHIO, A CORPORATION OF OHIO

MIXING MACHINE

Application filed August 24, 1927. Serial No. 215,220.

My invention relates to agitators and more particularly to a mixing apparatus of the translating type wherein one or more stirrers are independently operated through a planetary motion. Such agitators or mixing machines are employed for a wide variety of commodities of different densities or consistencies, necessitating different treatment at various speeds of operation. The present apparatus is also applicable to other purposes, such as the operation of a grinding machine, ice cream freezer, churn, pulverizer, fruit or vegetable press, or the like. Thus a wide range of speed change is required. To this end means is provided for connecting different tools or apparatus to differentially operated driving members for separate operation, according to the material operated upon and the required speed.

The apparatus as illustrated embodies an overhanging pedestal on which is mounted a direct motor driven planetary transmission mechanism having multiple driving connections operating at different speeds of rotation, one of which revolves about a fixed axis at a comparatively low speed, while other driving connections gyrate thereabout at different rates of speed, and preferably, though not necessarily in paths of different diameter.

Since these machines are frequently used by unskilled operators the tools or driven members for different operations are non-interchangeable with different driving connections thus compelling their operation at a predetermined speed since they cannot be interconnected with other than the proper driver. Swinging support arms, which are also vertically adjustable upon the pedestal, support a mixing vessel, a grinder or other appliance in operative relation with the power transmission mechanism.

The object of the invention is to simplify the structure as well as the means and mode of operation of such apparatus, whereby it will not only be cheapened in construction, but will be more efficient in use, uniform in operation, automatic in action, easily controlled and unlikely to get out of repair.

A further object of the invention is to provide an improved planetary transmission mechanism having multiple speed drive connections.

A further object of the invention is to compel the operation of various tools and appliances at predetermined speeds by preventing their connection with other than the proper drive elements.

A further object of the invention is to provide adjustable supporting means for the mixing vessel and other appliances to be associated with the power transmission mechanism.

With the above primary and other incidental objects in view, as will more fully appear in the specification, the invention consists of the features of construction, the parts and combinations thereof, and the mode of operation, or their equivalents, as hereinfter described and set forth in the claims.

Referring to the accompanying drawings wherein is shown the preferred, but obviously not necessarily the only form of embodiment of the invention, Fig. 1 is a side elevation partly in section showing the assembled mechanism forming the subject matter hereof. Figs. 2 and 3 are detail sectional views.

While the present apparatus may be constructed in various sizes and is applicable to the mixing of various commodities in industrial and commercial establishments it is especially applicable to household use for mixing cake batters, whipping cream or eggs, mashing potatoes, and similar operations and upon substitution of a meat grinder, food press, ice cream freezer, for the vessel shown in the drawing, the same apparatus may be utilized for driving such appliances. The apparatus is thus designed to afford a universal power stand from which may be derived either rotary or planetary motion at different rates of speed, the speed to be applied to different tools or appliances being predetermined and non-interchangeable.

Referring to the drawings, 1 is the pedestal having a supporting leaf or foot 2 which is preferably bifurcated to enable the power device to be set over a heater by which the contents of the vessel may be heated while being agitated. At its upper end the pedestal 1 is extended laterally at 2 and supports an electric motor 3 arranged with its armature or drive shaft vertically disposed. This drive motor 3 is supported upon a head or transmission housing 4 attached to the laterally disposed arm 2 of the pedestal by screw studs 5. The housing 4 comprises a head portion 6 from which depends a skirt or dependant flange 7, within which are enclosed the operating parts. The head portion is provided with a concentric upstanding flange 8 forming a lubricant chamber 9 to which leads a valved supply conduit 10. A cover plate 11 rests upon the flange 8 and forms the top wall of such lubricant reservoir. Within the reservoir is a wick 12 for supplying the lubricant to the operating parts by capilliary attraction.

Mounted centrally in the head portion 6 of the transmission housing 4 is a hollow stud or sleeve 13 peripherally shouldered at 14 to engage the under side of the head 6. The extremity of such hollow stud or sleeve 13 upon the head 6 is screw-threaded to receive a collar or nut 15 by which the hollow stud is fixedly clamped to the head 6 of the transmission housing. This hollow stud or sleeve 13 is provided with a bearing bushing 13a pinned to the stud or sleeve 13 at 16. At its lower end the hollow stud or sleeve 13 is provided with a second peripheral shoulder 17 which engages with a stationary spur gear 18 secured thereto by a key or stud 19. This stationary spur gear 18 comprises a stud gear of a planetary train. Journalled within the bearing sleeve 13a of the hollow stud or sleeve 13 is a rotary stud shaft 20 carrying at its lower end a spur gear pinion 21. The upper end of the stud shaft 20 is provided with a transverse slot or clutch holder to engage the corresponding shouldered extremities upon the motor armature or drive shaft 22. Journalled upon the stationary hollow stud 13 above the stud gear 18 is a hollow rotary casing 23. For convenience of manufacture and assembly the casing 23 is formed in two separable portions. The engaging margins of these portions are shouldered or rabbeted as shown at 24, and the parts are interconnected at spaced intervals by screw studs 25 as shown in the detail view Fig. 3. Journalled in the lower portion of the casing 23 in an eccentric position is a spindle 26 carrying at its upper end a spur gear 27 meshing with the pinion 21. For this reason motion is transmitted from the main drive shaft 20 through the transmission mechanism to the spindle 26, the lower end of which projects beyond the casing 23 and is provided with coupling means for engaging a beater or stirring tool or other appliance. Immediately below the gear 27 the spindle 26 carries a second gear or pinion 28 which meshes with an idler gear 29 revolubly mounted upon a stationary stud 30 secured in the lower portion of the revoluble casing 23. This stud 30 is concentrically mounted in such revoluble casing 23 and is in axial alignment with the drive shaft 20 and primary pinion 21, although separate from and independent thereof. Fixedly connected with the idler gear 29 by means of the stud or sleeve 30 is a pinion 31 which rotates in unison with the gear 29 and meshes with a larger gear 32 secured upon a second spindle 33. This spindle is also revolubly mounted in the lower portion of the rotary casing 23. The spindle 33 is also journalled at its upper end in the upper portion of such rotary casing and is provided with peripheral gear teeth 34 forming an integral pinion which meshes with the stationary spur gear 18. By the engagement of the pinion 34 with the gear 18 and its progressive travel about such stationary stud gear as the spindle 33 is rotated, rotary motion is transmitted to the hollow casing 23 within which this planetary transmission train is contained. The lower end of the spindle 33 is likewise provided with coupling means for engaging therewith a beater or stirring implement or other appliance. Tracing the transmission train a motor shaft 22 rotates the main drive shaft 20 by direct engagement therewith, which carrying the gear 21 meshing with the gear 27 rotates the spindle 26 which also carries the pinion 28. This pinion 28 meshing with the idler gear 29 rotates such gear and with it the gear pinion 31, which in turn meshing with the gear 32 rotates the spindle 33. The spindle 33 also carries the gear pinion 34 meshing with the stationary stud gear 18 and is caused to travel thereabout at the rotation of the spindle. This spindle being mounted at its opposite ends in the respective portions of the rotary casing 23 carries such casing with it to rotate upon the stationary hollow stud 13. The gear 27 being of greater diameter than the primary pinion 21 causes the spindle 26 to be rotated at a lower rate of speed than the primary shaft 20 and motor drive shaft. Further speed reduction is effected between the gear pinion 28 on the spindle 26 and the idler 29, and the speed is again reduced by intermeshing the smaller pinion 31 connected with the idler 29 with the large gear 32 upon the second spindle 33. This causes the second spindle 33 to rotate at a very much lower rate of speed than the first spindle 26. Since the pinion 34 formed upon the spindle 33 is of very much less diameter than the stud gear 18 about which it travels upon rotation of the spindle 23 the hollow casing 23 will be carried with it at a very slow rate of rotation. The lower face of this rotary casing 23 is provided with a hub 35 provided with coupling means for engaging a stirring or beating implement or other appliance. The hub 35 being concentric with the casing 23 rotates about its own axis and hence any impliment or appliance connected therewith will have a mere rotary motion and not a planetary movement. It will be noted that the second or slow rotating spindle 33 is spaced a greater distance from the axis of rotation of the casing 23 and hub 35 and is the spindle 26. While these spindles 26 and 33 describe a planetary motion in which they rotate simultaneously about their own axis while traveling in pairs concentric with the axis of the casing 23 and hub 35 they travel in orbits of different diameters.

Any suitable type of coupling means may be provided on the spindles 26 and 33 and the hub 35 for engagement of tools or implements to be driven thereby. While, if desired, these couplings may be of identical size and character to enable the interchange of implements or tools with the different connections they are preferably made of different size or different character so that the implements, tools or appliances engageable with one of these driving elements cannot be interengaged with any other driving element of the series. This insures the operation of the various tools and appliances at the proper operating speed. Since the machine is primarily designed for household use, although applicable to other purposes, and will hence be used by persons unskilled or lacking judgment in mechanical matters, the provision of a plurality of driving elements operating at different rates of speed which are engageable with only specific tools or appliances non-interchangeable with other elements is considered a rather advantageous and important feature. For purpose of illustration the coupling means between the driving spindles 26 and 33 and the hub 35 and the several implements and tools, have been shown as simple forms of bayonet slots connections. It is to be understood that other forms of coupling means may be substituted. In the drawings there has been shown by solid lines the beater element 36 connected with the spindle 33. This implement is of the character suitable for mashing potatoes or mixing cake batters, or stirring fruits or vegetables while cooking. There has been likewise shown by dot and dash lines a whipping implement or tool 37 connected with the high speed spindle 26 and suitable for whipping eggs or cream or for use in candy making, and the like. These tools or implements have sockets at their upper extremities within which engage the ends of the driving spindles 26 and 33. Obviously the socket on the upper end of the whipping implement 37 is too small to engage with the spindle 33 while the hub or coupling connection of the beater element 36 is too large to engage with the high speed spindle 26. For connection with the rotary casing 23 the relation of the parts is reversed and the implement or device to be connected is provided with a stud end insertable within the hub 35. In this instance, for illustrative purposes, it has been shown by dotted lines in Fig. 1 a conventional form of meat or food grinder operatively connected with the hub 35 of the rotary casing 23 for operation at low speed. Slidingly adjustable within the vessel 1 is a vertically disposed shaft 39 upon which is detachably engaged a supporting arm 40 carrying a mixing vessel 41, within which the beater element 36 and whipping tool 37 are adapted to operate. For convenience of adjustment the shaft 39 is provided at one side with a series of rack teeth 42 with which engages a rotary pinion 33 connected with an operating handle or hand wheel 34. The shaft 39 is splined or flattened at one side as at 46 and formed in such flattened or grooved surface to receive the end of a clamp screw 47 operated by the hand wheel 48.

The arm 40 is secured to the end of the shaft 39 by a similar clamp screw 49 adjusted by the hand wheel 50. For releasing the clamp screw 49 the arm 40 may be removed from the shaft 39 and replaced by an arm 51 carrying an appliance or apparatus to be operated by one or another of the driving elements. In this case the arm 51 is shown as formed integral with the food grinder 52 shown by dotted lines in Fig. 1 which is shown coupled to the axial driving element or hub 35 of the rotary casing 23. For such food grinder there may be substituted an ice cream freezer, a fruit press, a pulverizer or any other rotary operated device. It is to be understood that only one of the driving elements is ordinarily employed at the same time. Therefore, for illustrating purposes the beater implement has been shown in dotted lines, the whipping tool in dot and dash lines and the food grinder in dotted lines. This is merely to show the relative positions of these various devices, which, it is to be understood will be used separately. For convenience and to improve the appearance of the apparatus the motor 3 is supplied by current through conductor wires connected through an inlet near the bottom of the hollow pedestal 1 and is governed by a switch 53 located at the top of the pedestal adjacent to the transmission housing.

The rotary casing 23 has a bearing at 55 on the other side of the head 6 of the transmission housing. To lubricate such bearing one or more hollow bosses or wells are formed in the periphery of the casing 23 as shown at 57 in Fig. 2. These wells communicate at their bottom with the interior of the casing 23 which is ordinarily filled with heavy lubricant. Wicks or packing material within the interior of such bosses or lubricant wells convey the lubricant to the bearing surface.

From the above description it will be apparent that there is thus provided a device of the character described possessing the particular features of advantage before enumerated as desirable, but which obviously is susceptible of modification in its form, proportions, detail construction and arrangement of parts, without departing from the principle involved or sacrificing any of its advantages.

While in order to comply with the statute the invention has been described in language more or less specific as to structural features it is to be understood that the invention is not limited to the specific details shown, but that the means and construction herein disclosed comprises the preferred form of several modes of putting the invention into effect and the invention is, therefore, claimed in any of its forms or modifications within the legitimate and valid scope of the appended claims.

Having thus described my invention I claim:

1. In a construction of the character described a plurality of rotary spindles, one of said spindles rotating upon a fixed axis, the other spindles having planetary motion around the first mentioned spindle, driving means operatively connected with said last mentioned spindles for simultaneously rotating the spindles at different rates of speed, an operative connection for transmitting motion from the planetary spindles to the spindle having a fixed axis of rotation, each spindle being adapted for engagement with a different driven element of a non-interchangeable series of such elements.

2. In a construction of the character described, a rotary mounting, a planetary gear train carried thereby including a stationary sun gear spindle journaled in the mounting, a planetary pinion carried by the spindle and meshing with the sun gear, means for rotating said pinion to effect its travel about the sun gear carrying with it the rotary mounting a second spindle mounted in said mounting, and means for rotating the second spindle at a different rate of speed from that of the first spindle and pinion, while being carried through an orbit due to the action of the first mentioned spindle and pinion, each spindle being adapted for engagement with a different driven element of a non-interchangeable series of such elements.

3. In a construction of the character described, a plurality of rotary driving members, means for simultaneously rotating the driving members at different rates of speed, means for simultaneously actuating a part of the rotary driving members through concentric paths of travel of different diameter and concentric with another of the driving members which rotates on a fixed axis and means for transmitting motion through the planetary members to that rotating on its fixed axis, each spindle being adapted for engagement with a different driven element of a non-interchangeable series of such elements.

4. In a construction of the character described, a plurality of rotary driving members, one of which rotates about a fixed axis the others of which described planetary movements in concentric paths of travel about the first mentioned driving member, and means for effecting simultaneous rotation of the driving members at different rates of speed, each spindle being adapted for engagement with a different driven element of a non interchangeable series of such elements.

5. In a construction of the character described, a driving member rotating about a fixed axis and a second driving member having planetary motion about the first mentioned driving member, and means for rotating the driving members at different rates of speed, each driving member being engageable with a different driven member of a non-interchangeable series of driven members.

6. In a construction of the character described, a driving member rotating about a fixed axis, a plurality of other driving members located different distances from the first mentioned driving member and having planetary motion in orbits at different diameters concentric with the first mentioned driving member, and actuating means for rotating the driving members at different rates of speed, each of the driving members being adapted for detachable engagement with a different driven member of a non-interchangeable series of such driven members.

7. In a construction of the character described, a driving member rotating about a fixed axis, a plurality of other driving members located different distances from the first mentioned driving member and having planetary motion in orbits of different diameters concentric with the first mentioned driving member, and actuating means for rotating the driving members at different rates of speed, each of the driving members being adapted for detachable engagement with a different driven member of a non-interchangeable series of such driven members.

8. In a construction of the character described, a plurality of rotary driving members mounted for planetary motion in concentric paths of travel of different diameter, and means for simultaneously rotating the driving members at different rates of speed, each of the driving members being adapted for detachable engagement with a different driven member of a non-interchangeable series of such driven members.

9. In a construction of the character described, a rotary mounting, a gear member stationarily mounted in concentric relation with the axis of rotation of the mounting, a driving pinion also mounted concentrically with the axis of rotation of the mounting for rotation independent of the mounting, a spindle eccentrically located in said mounting, a pinion carried thereby meshing with said driving pinion for rotating the spindle, a second spindle eccentrically located in said mounting and having rotative driving connection with the first mentioned spindle, and a gear pinion carried by the last mentioned spindle meshing with the stationary gear member about which it travels incident to the rotation of the spindle carrying with it the rotary mounting, each spindle being adapted for detachable engagement with a different driven element of a non-interchangeable series of such driven elements.

10. In a construction of the character described, a supporting structure, a driving motor, a rotary housing, a pair of eccentrically mounted spindles carried by the revoluble housing, a stationary sun gear mounted concentrically relative to the housing, a revoluble drive shaft concentric with the sun gear, a gear pinion carried thereby, a gear pinion carried by one of said spindles with which said drive shaft pinion meshes, a second pinion carried by the driven spindle, an idler gear meshing with said second pinion, a pinion on the second mentioned spindle with which the idler gear meshes, whereby the second spindle is rotated in unison with the first spindle, and an additional pinion on said second mentioned spindle meshing with the stationary sun gear whereby the rotation of the second spindle causes it to travel about the sun gear carrying with it the rotary housing in which both spindles are mounted, and a concentric element connection upon the housing.

11. In a construction of the character described, a rotary drive shaft, a rotary carrier concentric therewith, a pair of spindles revolubly mounted in said carrier, said spindles being operatively connected with each other for unison rotation, one of the spindles being operatively connected with the drive shaft, and a stationary sun gear concentric with the drive shaft with which the other spindle is operatively connected, to effect rotation of the carrier in unison with the rotation of the spindles, and a driving connection upon the rotary carrier additional to the spindles.

12. In a construction of the character described, a rotary drive shaft, a rotary carrier concentric therewith, a pair of spindles revolubly mounted in the carrier, driving means interconnecting the spindles for unison rotation at different rates of speed, a driving connection between one of said spindles and the drive shaft, a stationary sun gear with which the other spindle is operatively connected, whereby the rotation of said spindle effects a traveling motion of the said spindle about the sun gear carrying with it the rotary carrier at a rate of rotation different from that of either of the spindles, said spindles being adapted for connection with driven elements and said carrier being adapted for connection with a driven element independently of said spindles.

In testimony whereof, I have hereunto set my hand this 10th day of August A. D. 1927.

EVERETT P. LARSH.